(12) United States Patent
Stumpf et al.

(10) Patent No.: US 11,821,454 B2
(45) Date of Patent: Nov. 21, 2023

(54) WIRE THREAD INSERT

(71) Applicant: BÖLLHOFF VERBINDUNGSTECHNIK GmbH, Bielefeld (DE)

(72) Inventors: Michael Stumpf, Bielefeld (DE); Marcel Purrio, Bielefeld (DE); Theodor Wenniges, Salzkotten-Verne (DE); Klaus-Friedrich Grubert, Bückeburg (DE); Alexej Butov, Gütersloh (DE); Anna-Katharina Schreiner, Paderborn (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 649 days.

(21) Appl. No.: 16/766,427

(22) PCT Filed: Nov. 20, 2018

(86) PCT No.: PCT/EP2018/081989
§ 371 (c)(1),
(2) Date: May 22, 2020

(87) PCT Pub. No.: WO2019/101760
PCT Pub. Date: May 31, 2019

(65) Prior Publication Data
US 2021/0033139 A1 Feb. 4, 2021

(30) Foreign Application Priority Data

Nov. 23, 2017 (DE) .................... 10 2017 127 750.1

(51) Int. Cl.
*F16B 37/12* (2006.01)
*B25B 27/14* (2006.01)
*F16B 25/00* (2006.01)

(52) U.S. Cl.
CPC .......... *F16B 37/122* (2013.01); *B25B 27/143* (2013.01); *F16B 25/0005* (2013.01)

(58) Field of Classification Search
CPC ... F16B 37/122; F16B 25/0005; B25B 27/143
(Continued)

(56) References Cited

U.S. PATENT DOCUMENTS

| 534,164 A | 2/1895 | Larsh |
| 964,062 A | 7/1910 | Seddon |

(Continued)

FOREIGN PATENT DOCUMENTS

| CN | 103282164 A | 9/2013 |
| CN | 103573781 A | 2/2014 |

(Continued)

OTHER PUBLICATIONS

Written Opinion & International Search Report for PCT/EP2018/081989 dated Feb. 25, 2019, 15 pages.
(Continued)

*Primary Examiner* — Hadi Shakeri
(74) *Attorney, Agent, or Firm* — Reising Ethington P.C.

(57) ABSTRACT

Wire thread insert consisting of a body with a plurality of helically wound windings, in which the plurality of helically wound windings comprises a first end winding and a second end winding which define the body at opposite axial ends, the first end winding has a first integral form-fitting means in a first end section and the second end winding has a second integral form-fitting means in a second end section, so that in an installed state of the wire thread insert a form-fit rotation-inhibiting connection with an adjacent component structure can be produced via the first and the second integral form-fitting means respectively.

3 Claims, 15 Drawing Sheets

Figure 1:
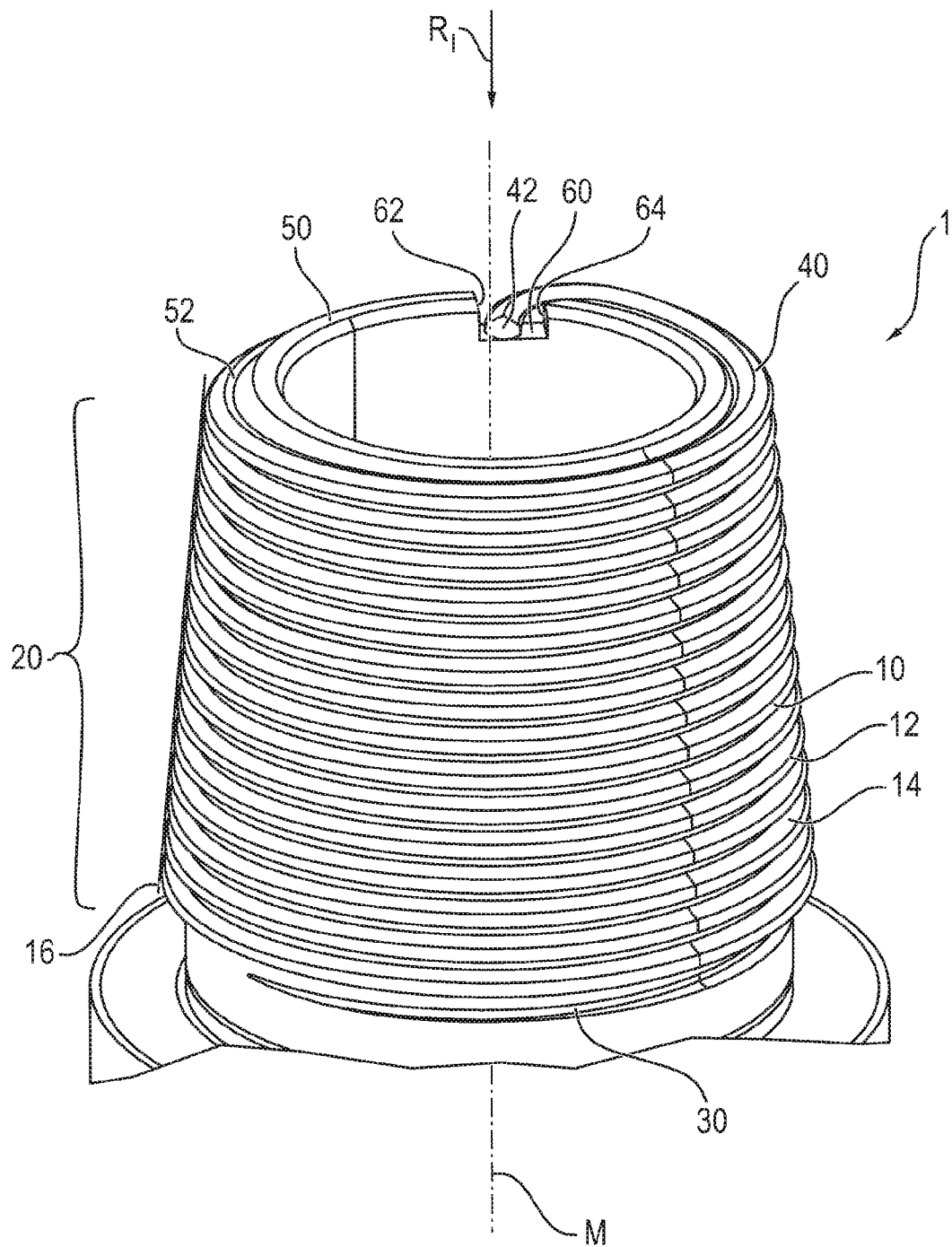

(58) Field of Classification Search
USPC .................................. 81/441, 15.7; 411/178
See application file for complete search history.

(56) References Cited

U.S. PATENT DOCUMENTS

| | | | |
|---|---|---|---|
| 2,150,876 | A | 3/1939 | Caminez |
| 2,152,681 | A | 4/1939 | Caminez |
| 2,363,663 | A | 11/1944 | Findley |
| 2,745,457 | A | 5/1956 | Lang |
| 2,751,238 | A | 6/1956 | Vegren |
| 3,062,568 | A | 11/1962 | Andresen et al. |
| 3,065,568 | A | 11/1962 | Reiss |
| 3,880,041 | A | 4/1975 | Markowski et al. |
| 3,945,070 | A | 3/1976 | Hauser |
| 4,553,303 | A | 11/1985 | Yamamoto |
| 4,563,119 | A | 1/1986 | Cosenza |
| 4,645,398 | A | 2/1987 | Cosenza et al. |
| 4,981,406 | A * | 1/1991 | Weiss .............. F16B 35/047 411/386 |
| 5,456,145 | A * | 10/1995 | Cosenza .............. B25B 27/143 81/448 |
| 6,146,073 | A * | 11/2000 | Kobusch .............. F16B 37/12 411/929.1 |
| 6,171,040 | B1 | 1/2001 | Sato |
| 7,086,150 | B2 * | 8/2006 | King, Jr. .............. H01R 4/22 29/874 |
| 8,850,680 | B2 | 10/2014 | Marxkors et al. |
| 9,719,546 | B2 | 8/2017 | Thommes et al. |
| 10,704,589 | B2 | 7/2020 | Thommes et al. |
| 10,774,868 | B2 | 9/2020 | Thommes et al. |
| 10,883,527 | B2 | 1/2021 | Thommes et al. |
| 2002/0168246 | A1 * | 11/2002 | Voznesensky ........ F16B 21/205 411/530 |
| 2009/0317209 | A1 | 12/2009 | Grubert et al. |
| 2014/0023453 | A1 * | 1/2014 | Hollensen .............. F16B 37/12 411/178 |
| 2017/0284444 | A1 | 10/2017 | Thommes et al. |
| 2017/0284445 | A1 | 10/2017 | Thommes et al. |
| 2017/0284446 | A1 | 10/2017 | Thommes et al. |

FOREIGN PATENT DOCUMENTS

| | | |
|---|---|---|
| CN | 104249326 A | 12/2014 |
| CN | 106312922 A | 1/2017 |
| DE | 2350905 A1 | 10/1974 |
| DE | 19740167 A1 | 3/1998 |
| DE | 69903394 T2 | 10/2003 |
| DE | 102010050735 A1 | 5/2012 |
| EP | 0228981 A1 | 7/1987 |
| EP | 1898107 A1 | 3/2008 |
| EP | 2405150 A1 | 1/2012 |
| ES | 291579 U | 5/1986 |
| GB | 408608 A | 4/1934 |
| GB | 583250 A | 12/1946 |
| JP | 2008298218 A | 12/2008 |

OTHER PUBLICATIONS

English translation of the International Preliminary Report on Patentability for PCT/EP2018/081989 dated May 26, 2020 (10 pages).

CN Office Action for CN Application No. 201880076151.1 dated Apr. 2, 2021 (15 pages).

* cited by examiner

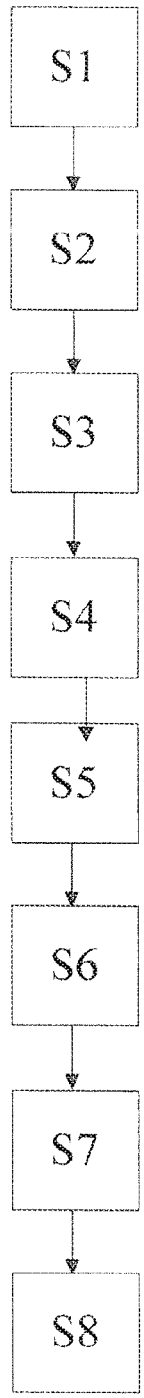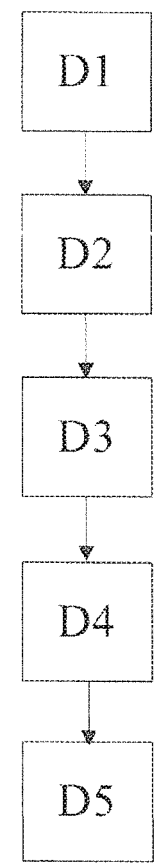
FIG. 15                    FIG. 16

WIRE THREAD INSERT

1. TECHNICAL FIELD

The present disclosure relates to a wire thread insert which is attachable to a bolt thread or a nut thread by means of a form-fit connection. Further, the present disclosure relates to a threaded bolt as well as a threaded opening with such a wire thread insert. Furthermore, the present disclosure is directed to methods for installation and deinstallation of such wire thread inserts on bolt threads and in nut threads.

2. BACKGROUND

Conventional threaded inserts in the form of a helically wound wire or a threaded bushing are used to reinforce the receiving thread of components made of materials of relatively low strength. For this purpose, the thread-armoring element is mounted in the receiving thread, after which the screw can be screwed into the thread-armoring element. The complete assembly thus requires two operations, on the one hand the insertion of the thread-armoring element into the receiving thread and on the other hand the insertion of the screw into the assembled thread-armoring element, which makes the assembly considerably more complex.

For inserting the thread-armoring element into the receiving thread, two assembly methods are commonly used. In the first assembly type, the helical wire is provided with a driving notch, via which a special tool drags the helical wire along and rotates it into the receiving thread, see for example U.S. Pat. Nos. 4,563,119, 4,645,398, 4,553,303, etc. With the other assembly type, the helical wire is provided at one end with a diagonally extending driving or installation tang, via which a special tool in turn drags the helical wire along and thereby rotates it into the receiving thread, see for example U.S. Pat. Nos. 2,152,681, 2,363,663, etc. The driving notch results in a change of the cross-section of the wire, which makes the winding process more difficult. The driving tang has the disadvantage that it must be broken and removed after assembly. In any case, a complex and costly special tool is required to insert the helical wire into the receiving thread.

From U.S. Pat. Nos. 2,150,876 and 2,745,457, a thread-armoring element is known in the form of a helical wire provided at one end with a diametrically extending driving tang. The corresponding screw is provided with a diametrically extending groove at its end facing away from the screw head, into which the driving tang of the helical wire snaps when the wire is mounted on the screw. The screw and the wire mounted on it can therefore be inserted together into the receiving thread of the component. Although this simplifies the assembly process, the manufacturing of the groove in the screw and of the tang on the helical wire requires a considerable effort.

The above-mentioned wire thread inserts are also described in EP 1 898 107 A1. In addition, EP 1 898 107 A1 discloses a wire thread insert which is fixed to a bolt thread by means of a frictional, also denoted as non-positive connection, and/or a substance-bonding connection, also denoted as firmly bonded connection. This wire thread insert thus also serves as a thread-armoring element for example on a threaded bolt or on a screw. The frictional connection between the bolt thread and in the wire thread insert is achieved by means of a winding with a tapered or reduced diameter. This winding with a tapered diameter is arranged in an axial end portion of the wire thread insert. The frictional connection is produced by one or two windings in an axial end section of the wire thread insert, the inner diameter of which is smaller than the thread diameter of the bolt or screw. In order to achieve a substance-bonding connection between the wire thread insert and the receiving thread, for example, an adhesive binding agent such as wax or glue is applied between the wire thread insert and the thread.

While the wire thread inserts described above consist of a body with a plurality of helically wound windings, which has a cylindrical shape, a wire thread insert with a conically shaped body is known from U.S. Pat. No. 3,065,568. Such conically or cone-shaped wound wire thread inserts are for example arranged on a conical bolt thread. Conically shaped thread partners are used to create a liquid-tight connection between two pipe pieces. In order to arrange the conically shaped thread insert securely on the bolt thread, both ends of the wire thread insert are connected to the bolt body. For these connections, which secure the position of the wire thread insert on the conical bolt thread, various alternatives are known. One possibility is to weld the two ends of the wire thread insert to the bolt body. According to another alternative, the two ends are flattened and then firmly connected to the bolt body by means of a pin or rivet. A third option is to weld a type of plug or pin to the ends of the tapered wire thread insert so that they can be inserted into a corresponding opening in the tapered bolt body. In accordance with the connection measures between conical wire thread insert and conical bolt thread as summarized above, it is clear that this type of thread armoring is time-consuming and labor-intensive.

Based on the above mentioned prior art, the object of at least some implementations of the present invention is to provide an alternative construction of a thread-reinforcing wire thread insert which is fastenable in a self-locking manner on a threaded portion without requiring additional working steps for this type of fastening.

3. SUMMARY

The above object is solved by a wire thread insert, by a threaded bolt in combination with a wire thread insert, by a threaded opening of a nut thread in combination with a wire thread insert and by a connection of a threaded bolt and a threaded opening with at least one wire thread insert. Further designs and further developments arise from the following description, the accompanying drawings and the appending patent claims.

The wire thread insert consists of a body with a plurality of helically wound windings. The plurality of helically wound windings comprises a first end winding and a second end winding which define or delimit the body at opposite axial ends. The first end winding has in a first end section a first integral form-fitting means and the second end winding has in a second end section a second integral form-fitting means, so that in an installed state of the wire thread insert a form-fit rotation-inhibiting connection with an adjacent component structure can be established via the first and the second integral form-fitting means respectively.

The present disclosure relates to a wire thread insert which is known in its basic structure. It consists of a plurality of helically wound windings, the size of which is adapted to a thread to be reinforced. Such wire thread inserts are provided for bolt threads in the same way as for nut threads. A wire thread insert for a bolt thread may be configured undersized with respect to the outer diameter of the bolt thread. This means that the wire thread insert encloses the bolt thread due to its inherent spring force. Analogously, a wire thread insert designed for a nut thread has an oversized configuration. Accordingly, the wire thread insert presses itself into the inner thread of the threaded opening when installed. Since a frictional connection between the wire thread insert and the corresponding thread is only an optional feature due to the above-described undersize or oversize of the wire thread insert or leads to only low retention forces, an integral form-fitting means is provided for both axial ends of the wire thread insert. This form-fitting or positive means engages in the adjacent component wall of the threaded bolt or the nut thread, respectively. Accordingly, it may also be preferred that the integral form-fitting means engages in the nut thread or the bolt thread. The two integral form-fitting means are arranged in such a manner that, due to their shape and/or orientation with respect to the longitudinal axis of the wire thread insert, they form a rotation-inhibiting undercut for the wire thread insert. This rotation-inhibiting undercut thus contributes to the stable retention and positioned fastening of the wire thread insert within the receiving thread, that is, the bolt thread or the nut thread. Since the two integral form-fitting means provided at the end sides are a permanent component of the wire thread insert, due to their arrangement they also automatically produce a form-fit connection with the adjacent component wall at the end of an installation process of the wire thread insert. Accordingly, the integral form-fitting means of the wire thread insert thus lead to an automatic connection with the bolt thread or the nut thread, so that the wire thread insert is protected against twisting or rotation within the receiving thread. As a result, no additional bolts, rivets or welds are required for fastening the wire thread insert onto the threaded bolt or in a threaded opening.

According to a further embodiment o, the first and the second form-fitting means are equally oriented, in particular radially inwards or radially outwards with respect to the helically wound windings.

The two form-fitting means in the axial end portion of the wire thread insert use the respective adjacent component wall of the threaded bolt or the nut thread. If the wire thread insert is adapted to a bolt thread, the two integral form-fitting means are oriented radially inwards with respect to the windings of the wire thread insert. Accordingly, in the installed state they engage in corresponding recesses of the threaded bolt in order to lock themselves there in a form-fit or positive manner. Analogously, the integral form-fitting means of a wire thread insert for a nut thread are oriented radially outwards in the direction of the adjacent wall of the nut thread. In the installed state, the integral form-fitting means engage there in the respectively provided recesses or structures in order to establish the rotation-inhibiting form-fit connection between wire thread insert and nut thread or the component wall of the threaded opening.

According to another embodiment, the first and the second form-fitting means respectively provide a first and a second rotation-inhibiting undercut which are oriented opposite to each other.

In general, threaded connections are exposed to frictional forces in the portion of the interengaging thread turns. When using a wire thread insert, these frictional forces cause the installed wire thread insert to be subjected to torque. Depending on the direction of rotation of the thread elements to be connected relative to each other, the wire thread insert is loaded with torques opposing each other. In order to ensure that the installed wire thread insert cannot be released from its position, regardless of the effective direction of the torque, the two integral form-fitting means form rotation-inhibiting undercuts acting in opposite directions. The respective rotation-inhibiting undercut ensures that the installed wire thread insert is not released from its thread by a possibly expanding torque during a friction-intensive rotation of the threaded connection. This may apply to both rotational directions, which is the reason why the integral rotation-inhibiting form-fitting means are configured opposing each other.

According to another embodiment, the first form-fitting means comprises a latching hook adjacent to a recess in the first end section and the second form-fitting means comprises an end tang in the second end section The end tang may be formed by a radially inwardly bent end section of the wire end. This wire end accordingly projects radially inwards into the interior of the helically wound windings. Since this end tang is intended to realize a rotation inhibition, it may have a radial extension of less than 30% of the radius of the wire thread insert. In addition, it may be preferred that the end tang is at least radially inwardly oriented, but does not have to be aligned exactly with a central point of the helically wound windings of the wire thread insert. It is decisive for the functioning of the end tang that it forms a rotation-inhibiting undercut.

The latching hook of the first form-fitting means may be formed in the wire of the wire thread insert. A recess is provided for this purpose so that a projection adjacent to the recess or a projection limiting this recess forms a latching or locking face. As soon as this latching face engages in a corresponding recess or against a projection on the threaded bolt or in the threaded opening, a rotation-inhibiting undercut is formed in this way.

According to another embodiment, the body of the wire thread insert is cylindrical in shape. Furthermore, following the above explanations, the first and the second form-fitting means are oriented radially inwards so that the wire thread insert provides a thread reinforcement for a bolt thread.

According to another embodiment, the windings comprise at a radial outer side of the cylindrical body a thread profile and at the inner side an anchoring profile. In addition, the windings of the cylindrical wire thread insert may be dimensioned to be undersized with respect to their diameter compared to a diameter of the bolt thread. This undersized configuration of the diameter of the wire thread insert may ensure that the cylindrically shaped wire thread insert holds itself in the bolt thread in its installed state due to its inherent spring forces.

According to another embodiment of the cylindrical wire thread insert, the first and the second form-fitting means are oriented radially outwards so that the wire thread insert provides a thread reinforcement for a nut thread of a threaded opening. In this context, it may also be preferred that the windings of a cylindrical wire thread insert for a nut thread provide an anchoring profile at a radially outer side and a thread profile at a radially inner side. This ensures that the wire thread insert can reliably anchor itself in the nut thread and thus fasten and position itself. In addition, the windings may have an oversized configuration with respect to their diameter compared to a diameter of the nut thread. This configuration may ensure that, due to its inherent spring forces, the wire thread insert frictionally fastens itself into the nut thread.

According to another embodiment of the wire thread insert, the body of the wire thread insert is shaped conically. In this configuration, the helically wound windings form a conical or cone shaped outer contour of the wire thread insert. This shape makes it possible to arrange the wire thread insert on a conical bolt thread or within a conically shaped threaded opening and to fasten it there automatically in a stable position. In this context it may be preferred that the first and the second form-fitting means are oriented radially inwards so that the wire thread insert provides a thread reinforcement for a conical bolt thread. Accordingly, it may also be preferred that the first and the second form-fitting means are oriented radially outwards so that the wire thread insert provides a thread reinforcement for a conical nut thread.

In order to ensure a reliable retention of the conical shaped wire thread insert on a conical bolt thread, the first end winding has a larger diameter than the second end winding and the latching hook is arranged in the first end section and the end tang is arranged in the second end section.

Due to the above summarized configuration of a conically shaped wire thread insert for a conical bolt thread, the rotation-inhibiting latching hook may be located in the largest winding of the wire thread insert with regard to its radius. Accordingly, the end tang is located in the winding with the smallest diameter of the wire thread insert. This leads to the configuration that the latching hook is located in a rather difficult to access threaded portion. In contrast to this, in the installed state, the end tang may be located in an initial portion of the conically shaped bolt thread. Due to this arrangement, the end tang is accessible to selectively apply a torque and a release force to the end tang in order to assist installation and deinstallation of the conical wire thread insert. If, for example, a torque is applied in the turn direction of the bolt thread during installation of the wire thread insert, this leads to an expansion of the wire thread insert. A targeted expansion of the wire thread insert supports installation on the conically shaped bolt thread until the latching hook and the end tang are locked in a form-fit manner. For a deinstallation of the conically shaped wire thread insert, it may be of advantage to expand the conically shaped wire thread insert by means of a releasing torque and a selectively applied torque on the end tang. In this way, deinstallation, that is, the removal of the conically shaped wire thread insert from the conically shaped bolt thread is facilitated, in order to replace it with a new wire thread insert in the event of excessive wear, for example.

The present disclosure further comprises a threaded bolt with a cylindrical outer thread, on which a wire thread insert is arranged according to one of the above-described cylindrical embodiments of the wire thread insert. The present disclosure further comprises a threaded bolt with a conical outer thread on which a conically shaped wire thread insert is arranged according to one of the above-described embodiments. Further, the present disclosure comprises a threaded bolt with a cylindrical inner thread, in which a cylindrically shaped wire thread insert is arranged according to one of the above-described embodiments. Furthermore, the present disclosure comprises a threaded opening with a conically shaped inner thread, in which a conically shaped wire thread insert is installed or arranged according to one of the above-described embodiments.

According to another embodiment, a connection of a bolt with an outer bolt thread and a threaded opening with an inner nut thread is covered by the present disclosure. This connection is qualified in that the bolt thread is provided with a wire thread insert according to one of the above described embodiments and/or the nut thread is provided with a wire thread insert according to one of the above described embodiments.

The present disclosure also comprises an installation method for a wire thread insert according to one of the above-described embodiments on a bolt thread. The installation method comprises the following steps: receiving the wire thread insert in an installation tool with a female installation thread comprising a thread turn, blocking the thread turn with a radially displaceable stop means, rotating the installation tool in a turn direction of the wire thread insert in such a manner that the stop means engages the wire thread insert at the end side opposite to an installation direction, wherein the installation tool is rotated until the two integral form-fitting means are locked at the bolt, and rotating the installation tool back in order to remove it from the wire thread insert.

The installation method screws or pushes the wire thread insert, which may be conical or cylindrical in shape, onto the bolt thread of the threaded bolt. Thereby an installation tool, described in more detail below, may be used. The wire thread insert is pushed or screwed onto the bolt thread until the two form-fitting means arranged at the ends have fastened themselves to the threaded bolt. In this process, the end-sided form-fitting means facing away from the installation direction, in this case the end tang, may serve to press the wire thread insert within the thread turn of the bolt thread in the screw-in direction. Since the end tang is bent radially inwards, as has been described above, it forms a sufficiently large stop face to move the wire thread insert forward. Forward in this context means against the screw-in direction of the bolt thread. During this screwing-on or pushing of the wire thread insert onto the bolt thread, the wire thread insert is exposed to frictional forces with the bolt thread. These frictional forces act against the screwing-on or pushing-on, which leads to an at least partial expansion of the wire thread insert during installation. This expansion also makes it easier to screw or push the wire thread insert onto the bolt thread. As soon as the integrally formed form-fitting means at the leading end of the wire thread insert has reached the recess provided at the threaded bolt, it snaps in at this point. At the same time, the end tang advances into a corresponding recess at the threaded bolt. In this way, the wire thread insert is connected in a form-fit manner at its two ends or in the portion of the two ends to the threaded bolt.

According to a further design, the installation method comprises the following step: pushing the wire thread insert at the end side having the stop means so that the wire thread insert is radially expanded, as described above.

It may further be preferred that the installation method comprises the further step: latching of the second form-fitting means in a recess of the threaded bolt and latching of the first form-fitting means in a receiving groove, which may have a lead-in chamfer.

The leading end of the wire thread insert may comprise a radially inwardly projecting latching hook. This second form-fitting means engages in a recess in the threaded bolt. The radially inwardly projecting end tang provided at the opposite end of the wire thread insert enters into a receiving groove on the threaded bolt as the first form-fitting means. This receiving groove may have a lead-in chamfer. This lead-in chamfer does not only facilitate the latching of the end tang at the threaded bolt, but also supports a deinstallation of the wire thread insert from the threaded bolt. This is because as soon as the wire thread insert is to be unscrewed from the bolt thread, the end tang may be pressed out of the receiving groove via the lead-in chamfer. In this way, the form-fit connection at the first form-fitting means is then released.

In order to facilitate the installation method, the female installation thread may be formed larger than the bolt thread, in particular the female installation thread exceeds the thread dimension of the threaded bolt by 2 to 10%.

The installation method is realized with the already mentioned installation tool. This installation tool, which is described in more detail below, comprises as an essential element a female thread section. In this female thread section the wire thread insert to be installed is receivable. At the same time, the tool also performs the above-mentioned screwing-on or pushing of the wire thread insert onto the bolt thread. For this purpose, the female thread section must have such dimensions that it can also be screwed onto the bolt thread after the wire thread insert to be installed has been received. It may therefore be preferred to provide the female installation thread with a thread dimension that is 2-10% larger than the thread dimension of the threaded bolt.

The present disclosure further includes a deinstallation method for the wire thread insert according to one of the above-described embodiments, which is arranged on a conically or cylindrically shaped threaded bolt and is detachably connected to the threaded bolt via two integrally formed form-fitting means. The deinstallation method comprises the following steps: screwing a deinstallation tool with a female receiving thread onto the threaded bolt with wire thread insert, unlocking the first form-fitting means from engagement with the threaded bolt by advancing an unlocking means, rotating the deinstallation tool in the unscrewing direction of the wire thread insert from the threaded bolt and unscrewing the wire thread insert from the bolt thread.

In the context of the above summarized deinstallation method for the wire thread insert, the installation method may be reversed. This means that the wire thread insert is now screwed or pushed off the bolt thread. In order to avoid a form-fitting blocking of the integral form-fitting means during this procedure, the second form-fitting means, the radially inwardly projecting latching hook, may be first released from its form-fit connection with the help of the unlocking means. An unlocking means consists, for example, of a radially adjustable actuator. This engages on the latching hook or alternatively on the end region of the wire thread insert and lifts the latching hook radially outwards from its latching in the recess at the threaded bolt. As soon as this form-fit connection has been released, an unscrewing of the wire thread insert from the bolt thread may begin. This unscrewing also may consist of pushing the wire thread insert out of the bolt thread. This pushing out is realized according to an embodiment by the unlocking means, which presses in the unscrewing direction against the end portion of the wire thread insert adjacent to the latching hook.

According to a further design of the deinstallation method, for receiving the end tang of the wire thread insert, a lead-in chamfer is provided in a recess in the threaded bolt in the screwing-on direction, via which the end tang is released from the recess during the pushing-out or unscrewing.

To facilitate the deinstallation of the wire thread insert from the bolt thread, no separate actuator engages the end tang of the wire thread insert to release it from the form-fit connection. Instead, the receiving groove of the end tang is designed such that it assists in releasing the form-fit connection between the threaded bolt and the end tang during the deinstallation method. In particular, the receiving groove comprises the lead-in chamfer already described above. As soon as the wire thread insert is screwed or pressed in the unscrewing direction, the end tang is moved out of the groove via the lead-in chamfer. Accordingly, the lead-in chamfer forms a lead-out chamfer or a release portion in the deinstallation process in order to release the form-fit connection between the integral form-fitting means, here the end tang, and the threaded bolt.

The present disclosure also includes a tool for a wire thread insert in order to install the latter on or remove the latter from a threaded bolt. The tool comprises the following features: a female installation thread with a thread turn, a movable stop means with which the thread turn can be selectively blocked and released, and an unlocking means which can be moved in a radial direction into the installation thread in order to release a form-fitting means.

According to a further design of the tool, the installation thread is formed 2-10% larger than a bolt thread of the threaded bolt. Furthermore, the stop means and the unlocking means may be realized by only one radially displaceable actuator, which comprises a driving or releasing construction at a radially inward projecting end.

As already explained above, the installation method and also the deinstallation method may be performed with a tool that comprises a female receiving thread for the wire thread insert. Since the radially movable stop means may selectively block the thread of the female receiving thread, the stop means may be used to screw or push the wire thread insert onto the bolt thread. In the same way, it is possible for this stop means to engage at the end portion adjacent to the latching hook in order to unscrew the wire thread insert from the bolt thread or to push it out of the bolt thread. As the stop means is movable into and out of the thread turn, it also may be used at the same time to release the latching hook from the form-fit connection with the threaded bolt. While on the one hand, the form-fit connections between the wire thread insert and the threaded bolt ensure an effective fastening of the wire thread insert in the bolt thread, on the other hand, they can be easily released again without the use of any equipment. It correspondingly may be preferred that the stop means and the unlocking means for at least the one form-fit connection are realized in one component of the tool.

4. BRIEF DESCRIPTION OF THE ACCOMPANYING DRAWINGS

Figure 2:
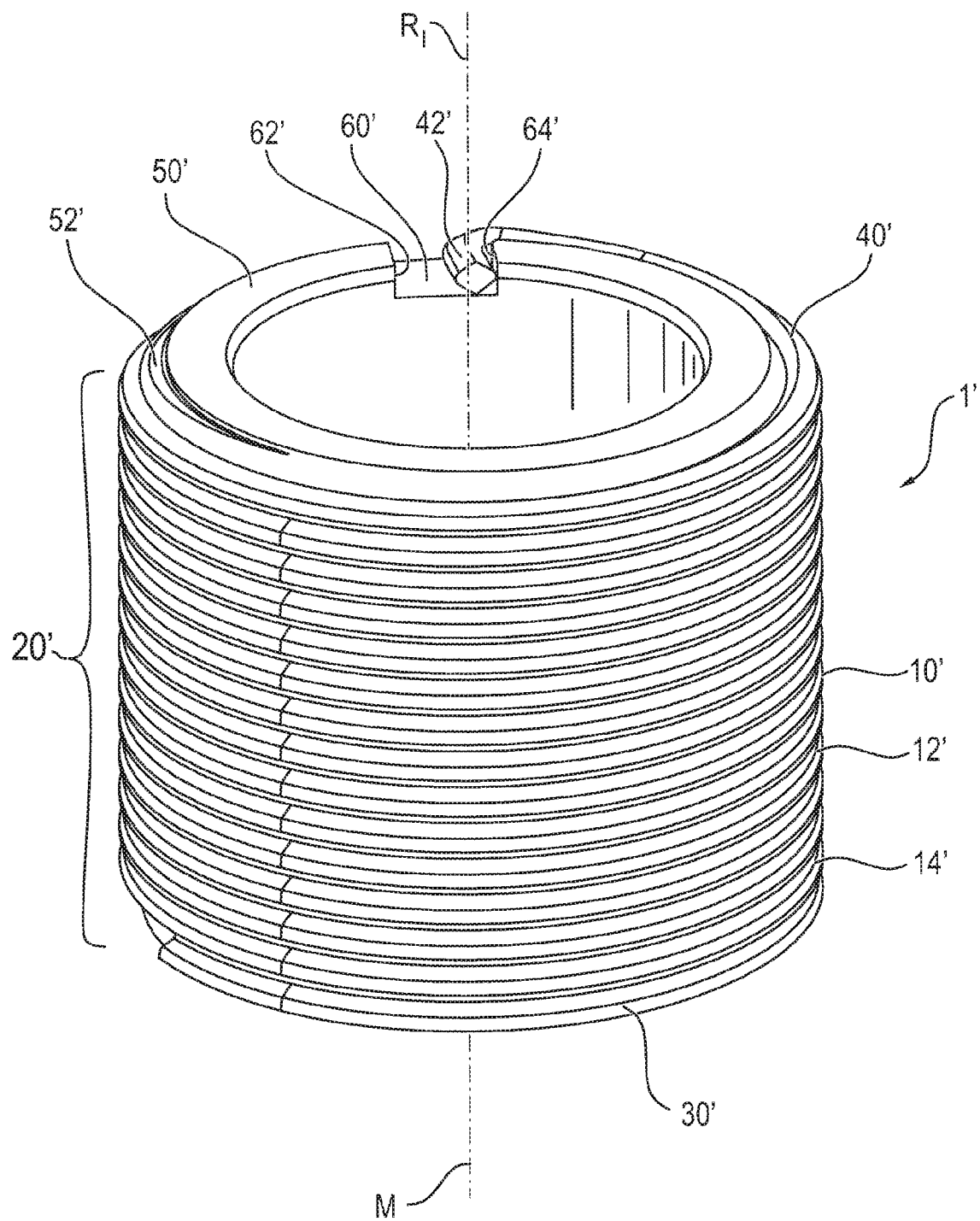
Figure 3:
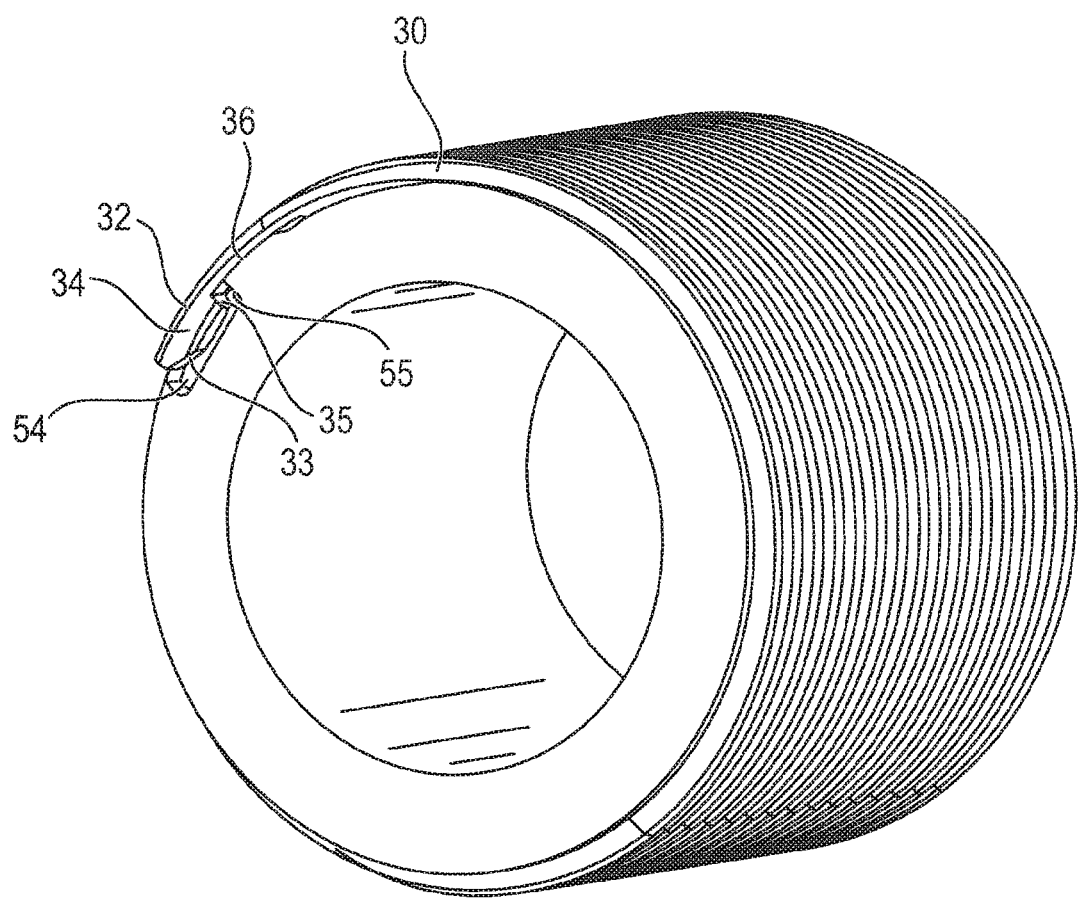
Figure 4:
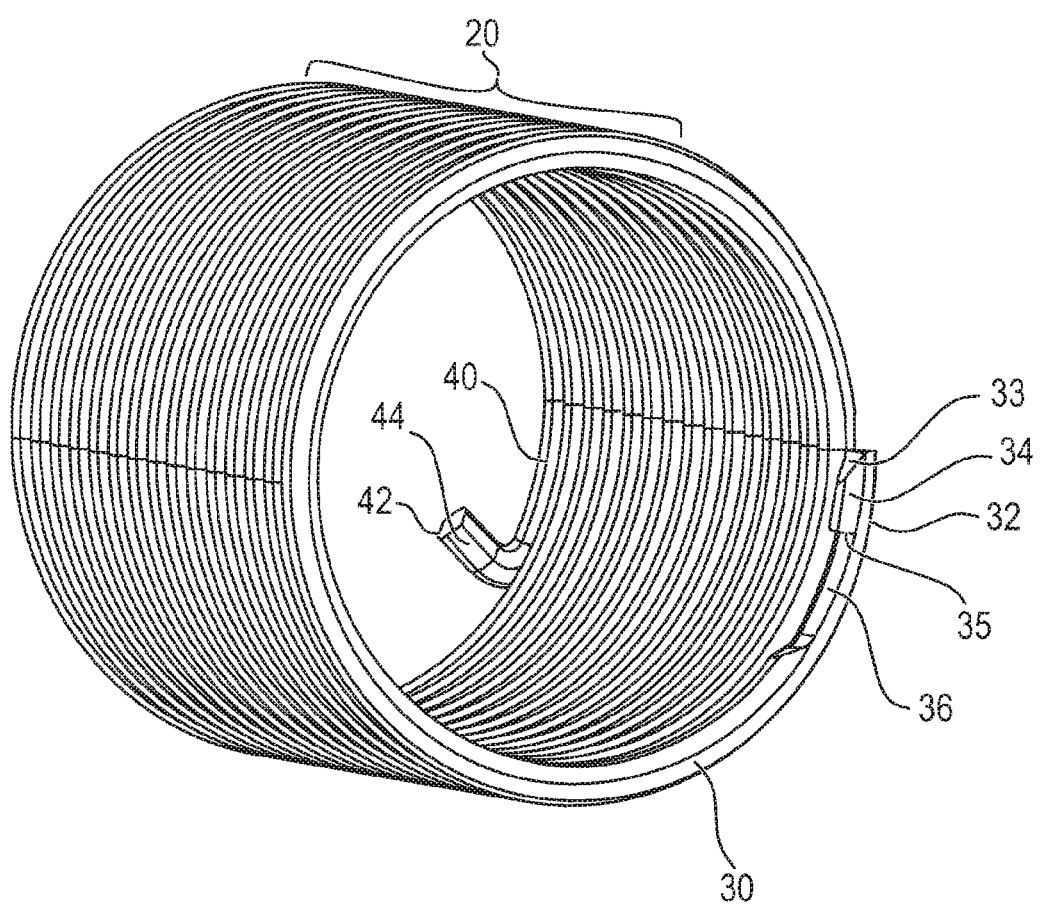
Figure 5:
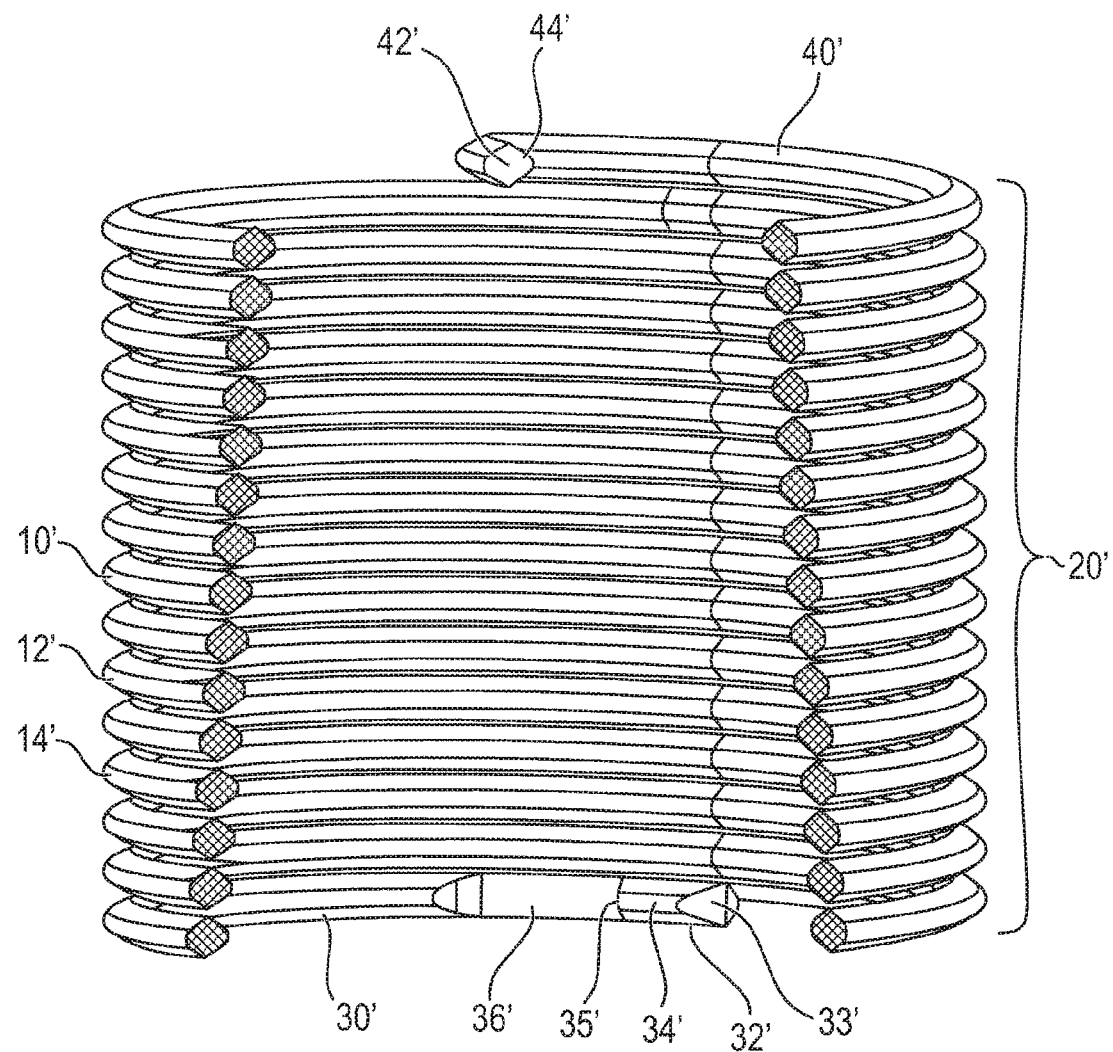
Figure 6:
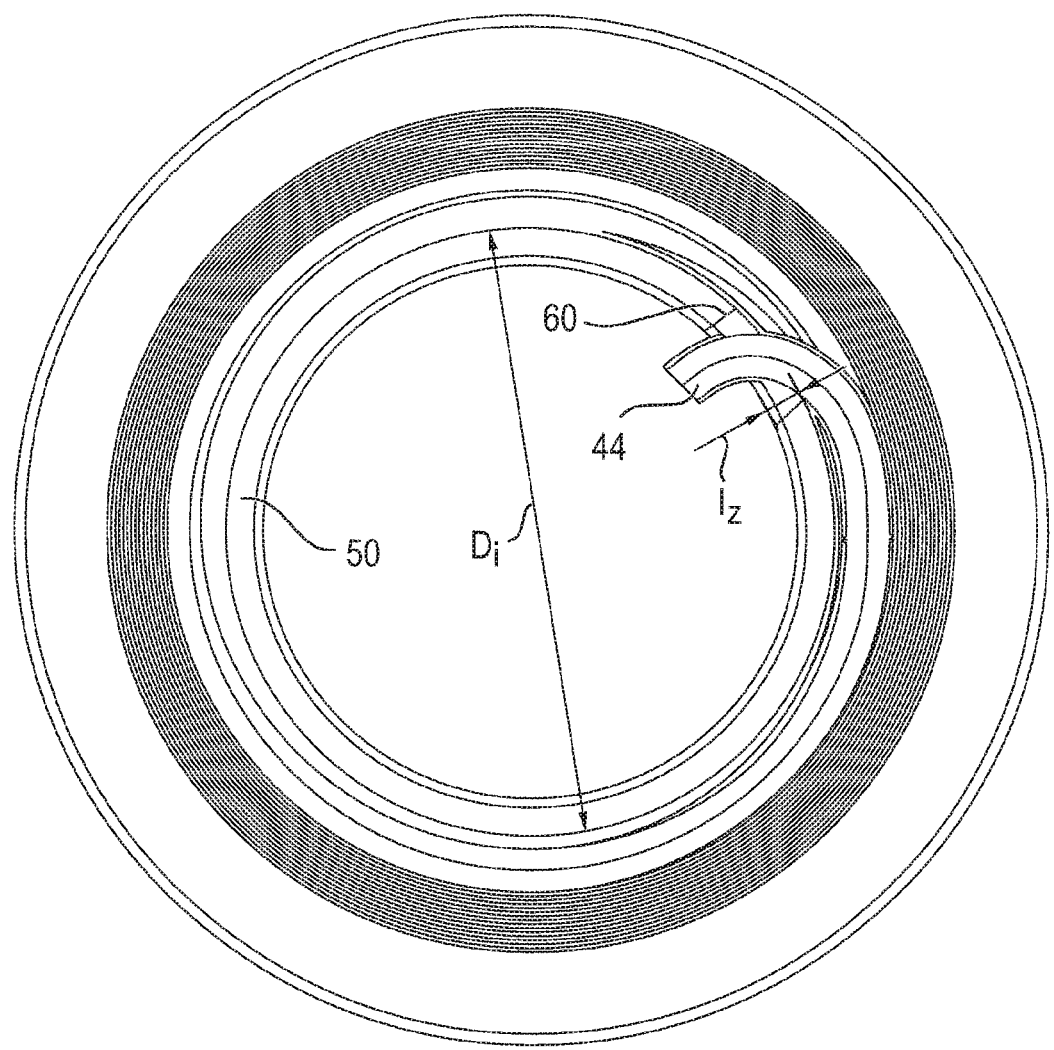
Figure 7:
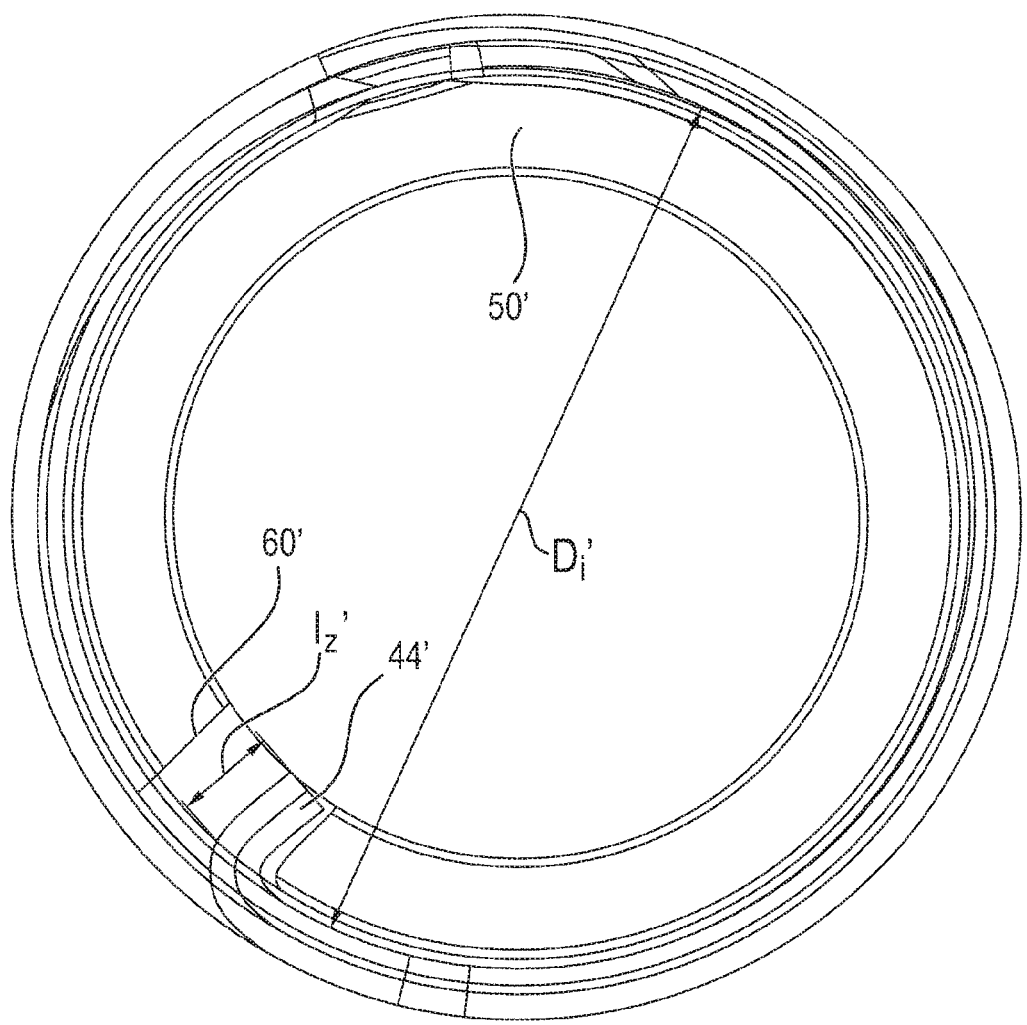
Figure 8:
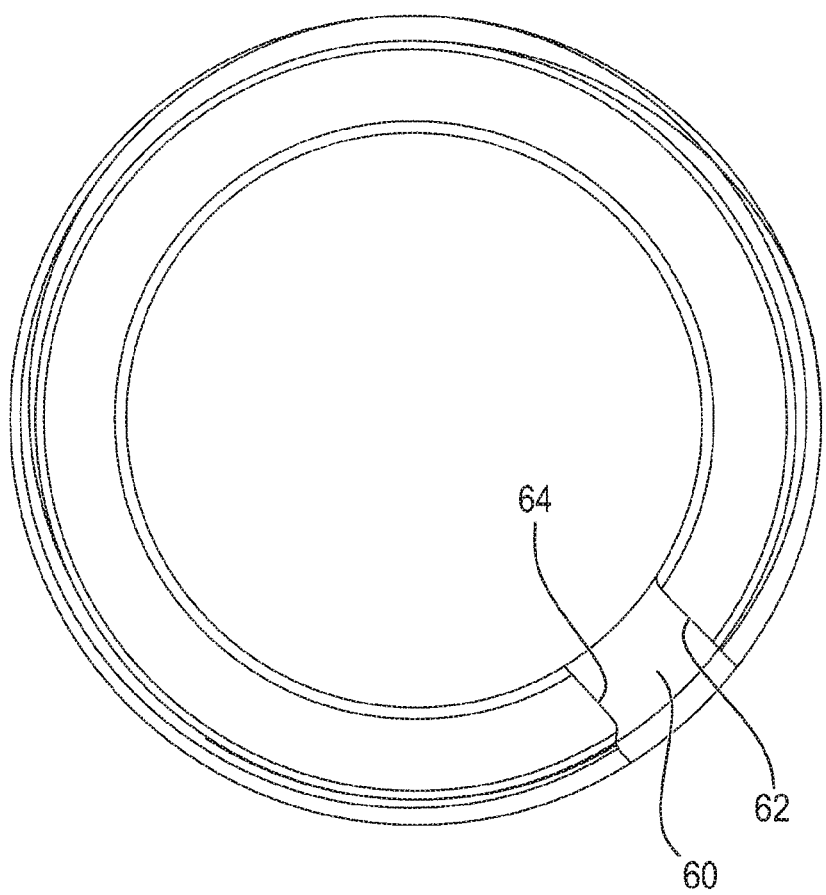
Figure 9:
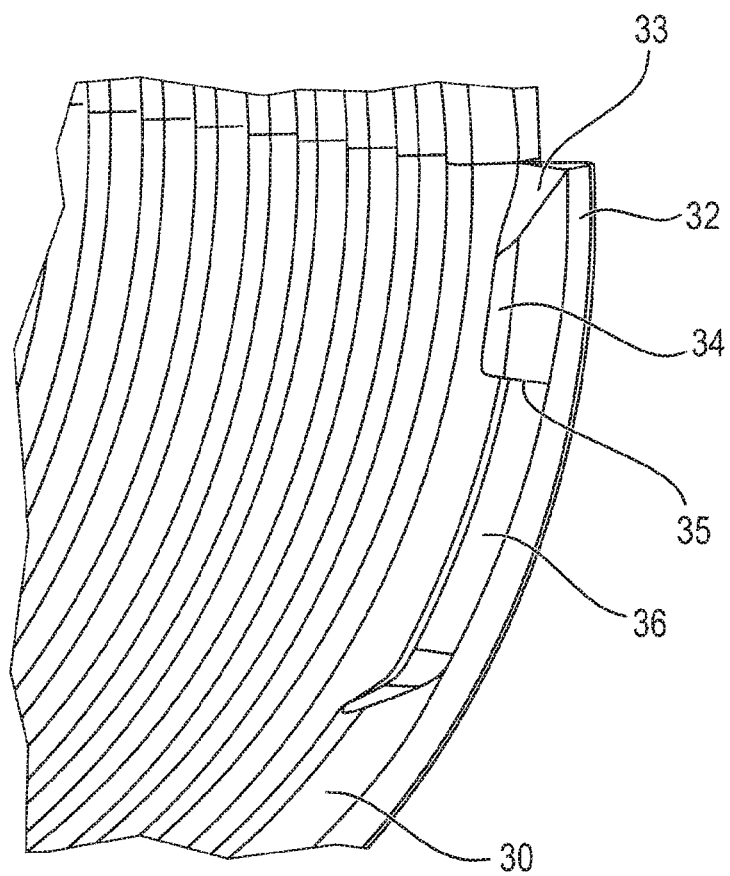
Figure 10:
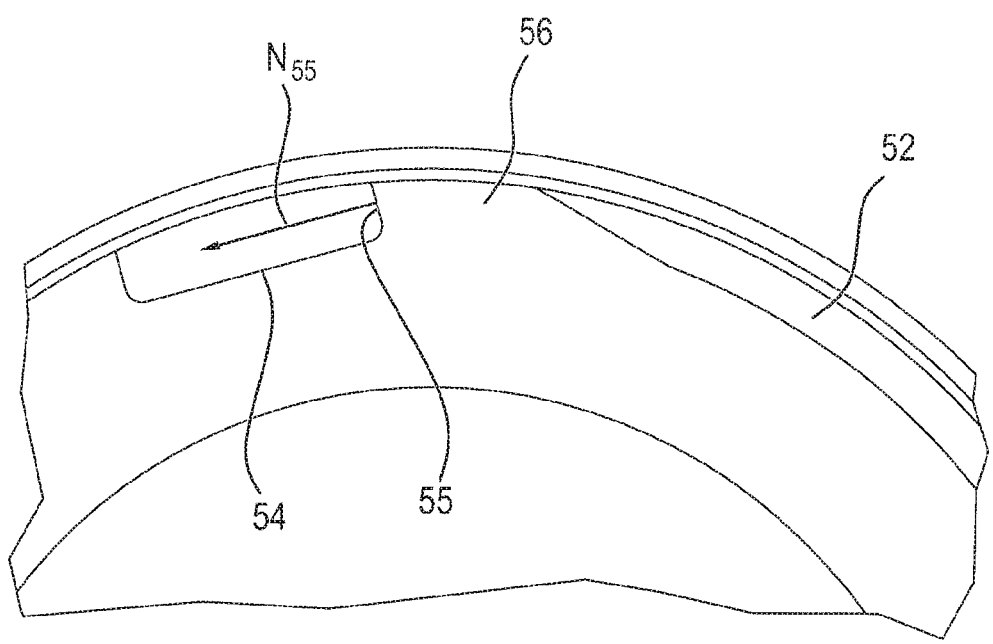
Figure 11:
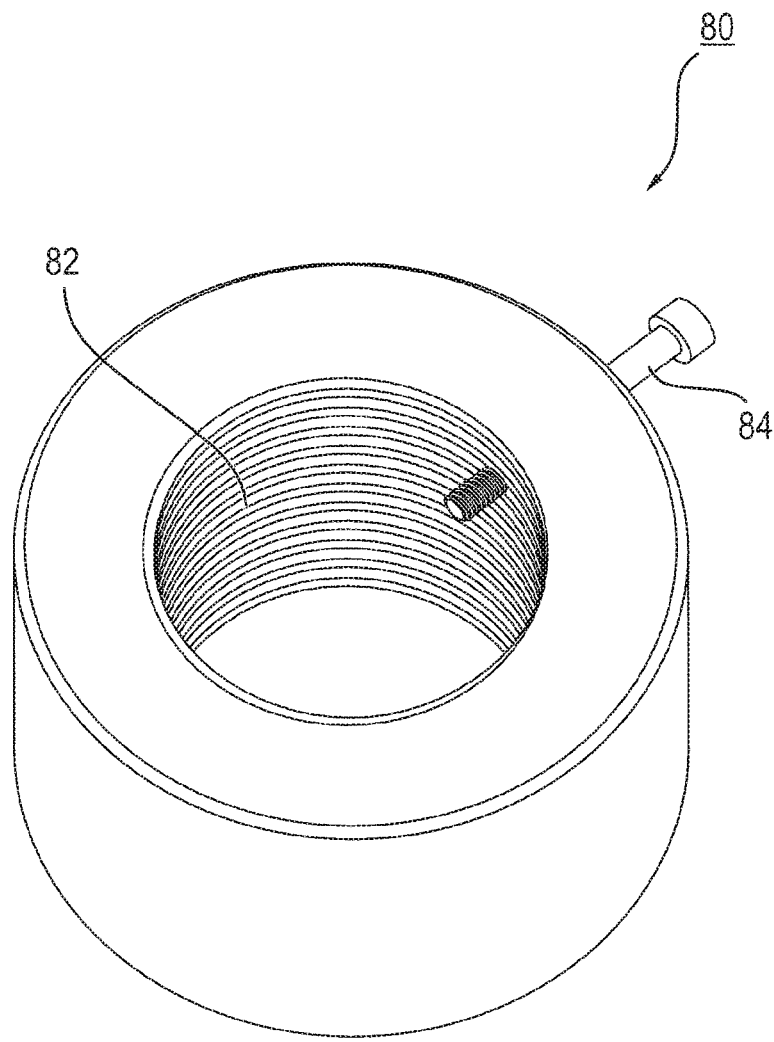
Figure 12:
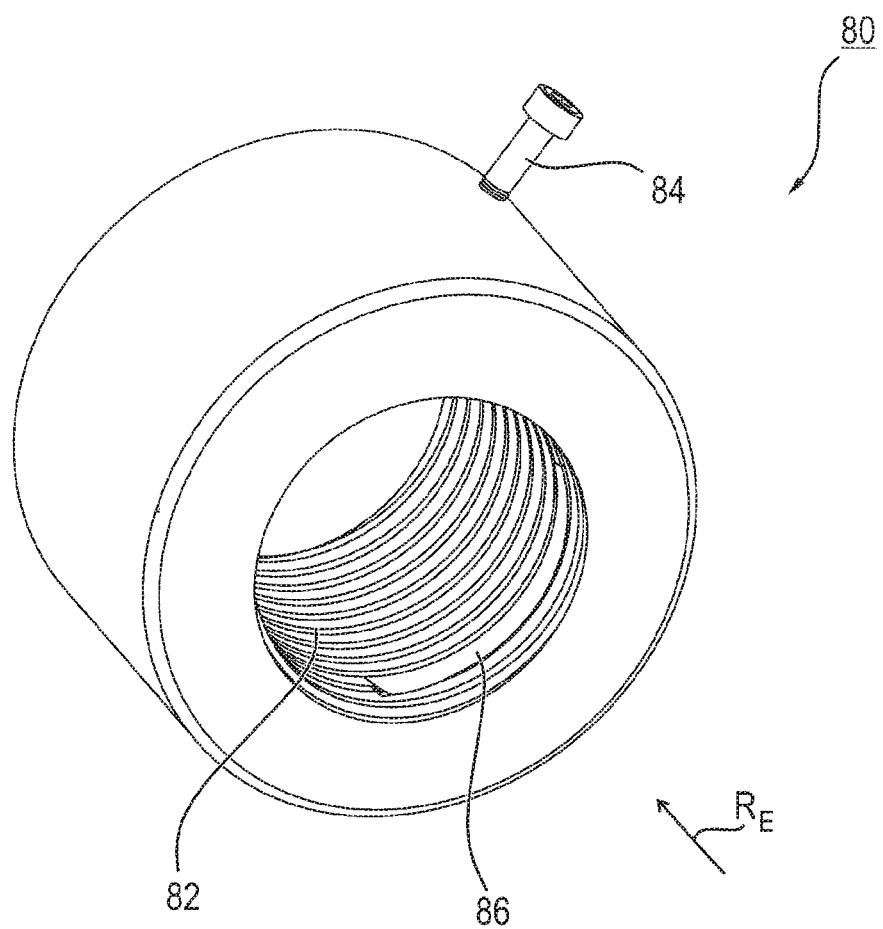
Figure 13:
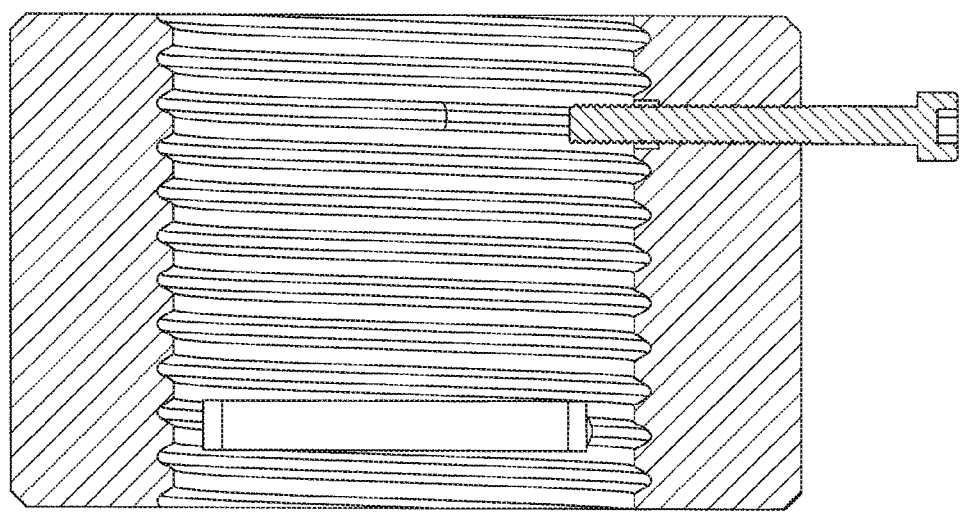
Figure 14:
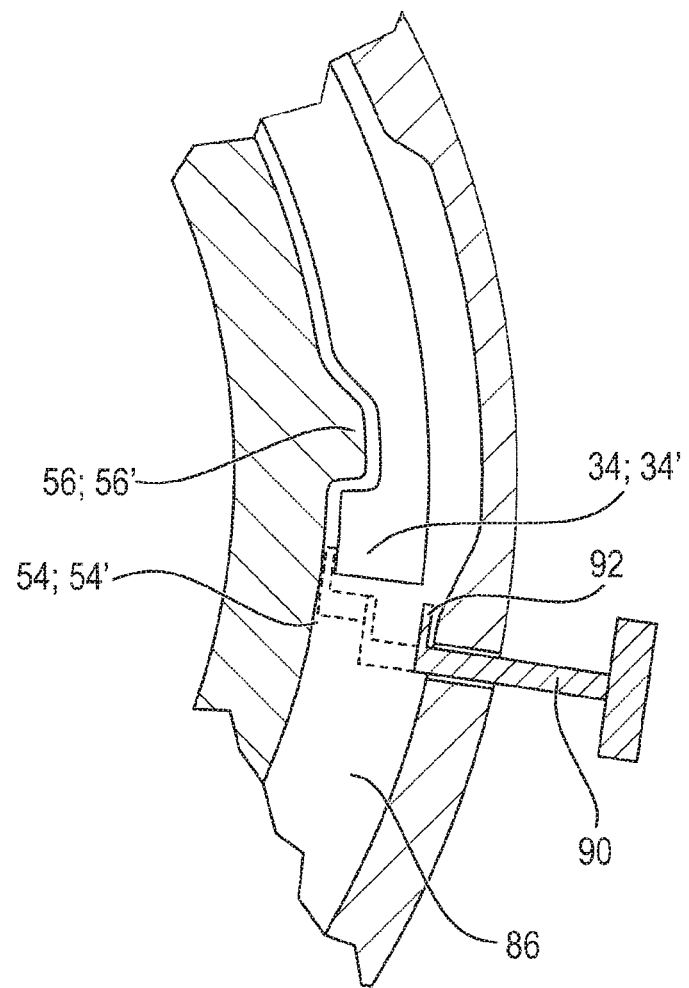

Some embodiments of the present disclosure are explained in more detail by reference to the accompanying drawing. Showing:

FIG. 1 an embodiment of a conically shaped wire thread insert which is installed on a conically shaped bolt thread, FIG. 2 an embodiment of a cylindrically shaped wire thread insert which is installed on a cylindrically shaped bolt thread, FIG. 3 is a perspective view of an attachment end of the wire thread insert according to FIG. 1, FIG. 4 a perspective view of the wire thread insert of FIG. 1, FIG. 5 a partial sectional view of the cylindrical wire thread insert of FIG. 2, FIG. 6 is a top view of an end tang of the wire thread insert according to FIG. 1, FIG. 7 an illustration of an embodiment of an end tang of the wire thread insert according to FIG. 2, FIG. 8 an embodiment of a receiving recess in the bolt body adjacent to the bolt thread, FIG. 9 an enlarged illustration of a d design of the latching hook, which may be used in combination with the conical and cylindrical wire thread insert, FIG. 10 an enlarged illustration of a design of the bolt body with a recess for receiving the latching hook of the wire thread insert according to FIG. 9, FIG. 11 a perspective view of an embodiment of the tool, FIG. 12 another perspective view of an embodiment of the tool of FIG. 11, FIG. 13 a partial sectional view of the tool of FIG. 12, FIG. 14 an enlarged illustration of an embodiment of the unlocking means of the tool, FIG. 15 a flow chart of an embodiment of the installation method, and FIG. 16 a flowchart of an embodiment of the deinstallation method.

5. DETAILED DESCRIPTION

FIG. 1 shows a perspective view of a wire thread insert 1 arranged on a bolt 50 with bolt thread 52. The wire thread insert 1 comprises a plurality of helically wound windings 10, 12, 14 which form a body 20 of the wire thread insert 1. A central axis M of the wire thread insert 1 at the same time defines an installation direction $R_I$, in which the wire thread insert is screwed onto or installed on the bolt thread 52 of the bolt 50.

When viewed in the installation direction $R_I$, the body 20 of the wire thread insert 1 is expanded. Accordingly, body 20 has a conical, especially a truncated cone shape. A diameter of the windings 10, 12, 14 increases in installation direction $R_I$. Accordingly, a cone angle α is enclosed between the central axis M and an outer lateral face 16 of the body 20. This angle may be within a range of $1° \leq \alpha \leq 25°$, or $2° \leq \alpha \leq 15°$ or within an angle range of $2° \leq \alpha \leq 8°$.

The cone angle of the wire thread insert 1 and that of the threaded bolt or threaded bore may be adapted to each other. This means that the cone angle of the wire thread insert 1 corresponds to the cone angle of the threaded bolt or threaded opening.

When viewed in cross-section, the windings 10, 12, 14 may have an anchoring profile on a radially inner side—that is, facing the receiving thread of the threaded bolt. This optional feature is suitable to assist the fastening of the wire thread insert in the receiving thread of the threaded bolt or the threaded bore. A profile is provided on a radially outer side which forms a thread shape as soon as the wire thread insert 1 has been installed in the bolt thread 52.

The installed wire thread insert 1' according to FIG. 2 has similar constructional features as the wire thread insert 1 of FIG. 1. These are indicated with the same reference signs as in FIG. 1. In contrast to the embodiment of FIG. 1, the body 20' of the wire thread insert 1' is cylindrical in shape. Accordingly, the windings 10', 12', 14' have the same diameter. The bolt 50' also has a cylindrical shape and the bolt thread 52' is enclosed by a cylindrical lateral face.

Both conical 52 and cylindrically shaped bolt threads 52' are generally known, so that with regard to the shape and dimensioning of these threads, reference is made to the prior art.

In order to initially fasten conically shaped and cylindrically shaped wire thread inserts 1, 1' frictionally on the bolt thread, it may be preferred to manufacture them with an undersize with respect to the bolt thread 52; 52'. Undersize in this context means that the wire thread insert 1; 1' has a smaller thread than the bolt. It may be preferred that the undersize is in the range of 1 to 5% and sometimes in the range of 2% to 4% with respect to the bolt thread.

The plurality of helically wound windings 10, 12, 14; 10', 12', 14' have a first axial end winding 30; 30' and a second axial end winding 40; 40'. As axial end winding 30, 40; 30', 40' is referred to, with respect to the body 20; 20', the last winding of the plurality of helically wound windings 10, 12, 14; 10', 12', 14' which is adjacent to the axial end face of the body 20; 20'. Each end winding 30, 40; 30', 40' comprises an integrally formed form-fitting means 32, 42; 32', 42'. These form-fitting means 32, 42; 32', 42' are used in analogous manner in conically shaped wire thread inserts 1 as in cylindrically shaped wire thread inserts 1'.

With reference to the conically shaped wire thread insert 1, the first end winding 30 may have a larger diameter than the second end winding 40. In the first end winding 30, the first integrally formed form-fitting means 32 comprises a latching hook 34 which is formed adjacent to a recess 36 at a radially inner side of the first end winding 30.

The latching hook 34 may have a turn-in chamfer 33, which supports an installation of the wire thread insert 1 in the bolt thread 52. The turn-in chamfer 33 is located on the radially inner side and at the free end of the first end winding 30.

In the installed state, the latching hook 34 snaps into a latching recess 54 on the bolt thread 52. The latching recess 54 is arranged in the bolt body or in the bolt thread 52. It provides a stop face 55 the face normal $N_{55}$ of which is approximately tangential to the bolt thread 52 and oriented in the turn-in direction of the wire thread insert 1. Due to this orientation, the stop face 55, as a stop portion and blocking face for a latching face 35 of the latching hook 32, forms a reverse rotation safety for the installed wire thread insert 1. For this purpose, a face normal $N_{35}$ of the latching face 35 is oriented approximately anti-parallel to the face normal $N_{55}$.

During the installation of the wire thread insert 1, it is screwed into the bolt thread 52. As soon as the integral form-fitting means 32 has moved out of the bolt thread 52 via an intermediate elevation 56 into the latching recess 54, it locks the wire thread insert 1 there against unscrewing from the bolt thread 52. Due to friction between the wire thread insert 1 and a surrounding receiving thread (not shown), such a backward rotation could occur without the simultaneous attempt of deinstallation and lead to a detachment of the wire thread insert.

In the second end winding 40, an end tang 44 may be provided in a second end section as integral form-fitting means 42. The end tang 44 protrudes approximately radially inwards in comparison to the course of the second end winding 40. In this connection it is not necessary that the end tang 44 points exactly to a central point of the second end winding 40. Furthermore, the end tang 44 may consist of an angular end of the second end winding 40. The end tang has a minimum length that may ensure an engagement of the end tang 44 in a corresponding recess 60 in the bolt body 50 or in a bolt thread 52. Since the end tang 44 provides an anti-rotation protection of the wire thread insert 1, due to its resistance to shear stress, even a short length is sufficient for this purpose. The length of the end tang 44, with which the end tang 44 may protrude radially inwards beyond the inner diameter $D_I$ of the wire thread insert 1, is from a range of 0.4 $B_D \leq L_Z \leq 3.0\ B_D$. In this context, $B_D$ indicates the radial width of the wire of the wire thread insert 1, which in the case of an approximately rhomboid wire cross section indicates the longer diagonal in the wire cross section. In the case of a square wire cross-section, the diagonals of the wire cross-section are of equal length.

As can be seen from FIGS. 1, 6 and 8, the radial recess 60 in the bolt 50 is formed as a groove open in the axial direction. The groove is open opposite the installation direction $R_I$. The groove may be limited in the tangential direction by the two blocking faces 62, 64.

As soon as the end tang 44 has snapped into the recess 60, the blocking face 64 may prevent further screwing-in of the wire thread insert 1 in the installation direction. Accordingly, the latching hook 34 cannot be pushed beyond the latching recess 54. The further blocking face 62 may prevent a back-turning of the wire thread insert 1, having the end tang 44 abut there, that is, at the blocking face 62. Due to its arrangement, the end tang 44 thus forms a rotation-inhibiting undercut in at least one rotational direction, which may block further screwing-in of the wire thread insert 1 and further may block unscrewing of the wire thread insert 1.

Accordingly, the rotation-inhibiting undercuts of the end tang 42 and the latching hook 34 are oriented opposite to each other. By this, incorrect installation by overtightening and deinstallation by screwing the wire thread insert 1 out of the bolt thread is avoided.

The above-described constructive design and arrangement of the integral form-fitting means 32, 42 can be applied analogously to a cylindrically shaped wire thread insert 1' according to FIG. 2. This can be seen from the partial sectional view in FIG. 5. Correspondingly, reference is made to the analogously applicable explanations for the above-mentioned embodiments of the wire thread insert with conical shape.

In general, it should be emphasized that the wire thread inserts, according to at least some embodiments, do not have an installation tang which is diametrically arranged according to the prior art. Such tangs serve as driving/installation and/or locking tangs. For a wire thread insert 1 of a conical or a cylindrical receiving thread of the threaded bolt, this diametral tang would be interfering, since the installation of the wire thread insert would be limited in the axial direction. For a wire thread insert of a conical or a cylindrical female thread (see below), this diametral tang would have to be removed in order to install a threaded bolt or similar within the female thread. This additional effort may be avoided.

In addition, the above-described features of the constructions of the wire thread inserts 1; 1' may also be transferred to conically and cylindrically shaped wire thread inserts for nut threads or threaded openings.

A wire thread insert for a nut thread may be provided with oversize with respect to a thread geometry of the threaded opening. This means that an outer diameter of the wire thread insert is larger than an inner diameter of the threaded opening. This ensures that the wire thread insert is pressed into the receiving thread due to its inherent spring properties and holds itself there via a frictional connection. It may be preferred that the oversize is in the range of 1 to 5% and further may be in the range of 2 to 4% with respect to the nut thread.

The functionality of the integral form-fitting means is maintained even when used in a wire thread insert for a nut thread. In contrast to the wire thread insert 1; 1' for a bolt thread 52; 52', the two integral form-fitting means are oriented radially outwards in order to be able to engage in the nut body or in a nut thread or in a component wall of the threaded opening.

It may be preferred in a connection of a threaded bolt and a female thread that at least one of the threads is reinforced by the wire thread insert described above. It may also be preferred to reinforce both threads, i.e. the bolt thread and the female thread, with one wire thread insert each. As soon as the respective reinforcement has been performed, the threaded bolt is screwed into the female thread and is fastened there.

In order to install the wire thread insert 1; 1' on the threaded bolt 50; 50', a tool 80 is provided. In a perspective view in FIGS. 11 and 12, characteristics of the tool 80 are shown to explain the principle of operation and functionality. It is understood that the tool 80 can be designed as a manual or automatic tool 80, without having to describe those in detail here.

The tool 80 comprises a female receiving thread 82. In the receiving thread 82 the wire thread insert 1; 1' is received in order to install the latter on the bolt thread 52; 52'. Depending on the outer shape of the threaded bolt 50; 50' and the wire thread insert 1; 1', the female thread 82 is formed conically or cylindrically.

For installation, the wire thread insert 1; 1' is screwed into the receiving thread 82 (S1). At this, the wire thread insert 1; 1' may be turned until a stop means 84 projecting into the thread turn of the receiving thread 82 blocks the thread turn and thus a further screwing-in (S2).

The stop means 84 may be formed by an actuator which can be moved into the thread turn of the receiving thread 82. The radial adjustment of the actuator may be realized by means of a threaded connection. In the same way, an axial displacement or motorized adjustment is also possible.

The wire thread insert 1; 1' may be screwed into the receiving thread 82 with the second form-fitting means 44; 44', that is, the end tang, first. For this reason, the wire thread insert 1; 1' may be positioned on or adjacent to the end tang at the stop means 84. The screw-in direction is indicated by RE. During the screwing-in, frictional forces counteract the sliding of the wire thread insert 1; 1' in the thread turn. Thus, the wire thread insert 1; 1' is expanded during the screwing-in, which assists the screwing-in.

The wire thread insert 1; 1' may be screwed into the receiving thread 82 until the first form-fitting means 34; 34' is arranged adjacent to a radial recess 86. The recess 86 increases the thread turn of the receiving thread 82 radially outwards. As a result, the recess 86 allows the first form-fitting means 34; 34', here the end latching hook 34; 34' (see FIG. 9), to slide over the intermediate elevation 56; 56' during installation of the wire thread insert 1; 1' and latch into the latching recess 54; 54' (see FIG. 10). During a deinstallation of the wire thread insert 1; 1', the recess 86 ensures that the latching hook 34; 34' can be moved radially outwards and then pushed or turned over the intermediate elevation 56; 56'.

The wire thread insert 1; 1' is screwed onto the bolt thread 52; 52' until the latching hook 34; 34' is engaged in the latching recess 54; 54' after passing the intermediate elevation 56; 56' (S6).

In addition, the end tang 44; 44' slides into the recess 60; 60' in the threaded bolt 50; 50' to latch therein (S7). The recess 60; 60' may have an insertion chamfer (not shown) instead of the side wall 62 (see FIG. 1). This facilitates the sliding of the end tang 44; 40' into the recess 60; 60'.

As soon as the end tang 44; 44' and the latching hook 34; 34' are latched, the wire thread insert 1; 1' is reliably fastened. The tool 80 is then unscrewed from the installed wire thread insert 1; 1'.

It may be preferred that the receiving thread 82 of the tool 80 is dimensioned 2 to 10% larger than the bolt thread 52; 52. This ensures that the wire thread insert 1; 1' is reliably receivable in the tool 80 and installable on the threaded bolt 50; 50'.

For the deinstallation of the wire thread insert 1; 1' from the bolt thread 52; 52', the tool 80 may comprise an unlocking means for the end-sided form-fitting means 34; 34'. The unlocking means may comprise a radially displaceable actuator 90. The actuator 90 is equipped with a driving or releasing construction 92 which projects into recess 86. In addition, the actuator 90 with the releasing construction 92 is movable in such a manner that the actuator 90 can release the latching hook 34; 34' from the recess/depression 36; 36' and move it into the recess 86 (D2). This movement and functionality are illustrated by the dotted lines in FIG. 14. Before this unlocking can take place, the tool 80 is screwed onto the threaded bolt 50; 50' with wire thread insert 1; 1' (D1).

After the latching hook 34; 34' has been unlocked in step D2, the tool 80 is rotated against the thread direction (D4). In doing so, the actuator 90 may move towards the end (D3) adjacent to the latching hook 34; 34' and begins to push out (D5) or unscrew (D6) the wire thread insert 1; 1' from the bolt thread 52; 52'.

The pushing out causes an expansion of the wire thread insert 1; 1' against the frictional forces to the bolt thread 52; 52. This also assists the deinstallation of the wire thread insert 1; 1'. In order to simplify the deinstallation, the end tang 44; 44' may slide out of the form-fit engagement, via the lead-in chamfer of the recess 60. The lead-in chamfer may be arranged instead of the limiting wall 62, as already described above.

The invention claimed is:

1. A tool for a wire thread for installing the latter on or removing it from a threaded bolt, wherein the wire thread insert is a conically formed wire thread insert comprising a body having a plurality of helically wound windings, in which the plurality of helically wound windings comprises a first end winding and a second end winding delimiting the body at opposite axial ends, and the first end winding has a first integral form-fitting means at a first end section and the second end winding has a second integral form-fitting means at a second end section, so that, in an installed state of the wire thread insert, a form-fit rotation-inhibiting connection with an adjacent component structure can be produced via the first and the second integral form-fitting means respectively, wherein the first and the second integral form-fitting means of the wire thread insert of a bolt thread are oriented radially inwards with respect to the windings of the wire thread insert, wherein the first integral form-fitting means comprises a latching hook adjacent to a recess in the first end section and the second integral form-fitting means comprises an end tang in the second end section, and the tool comprises the following features:
   a. a female installation thread with a thread turn,
   b. a movable stop means with which the thread is selectively blockable and releasable; and
   c. an unlocking means which is movable in a radial direction into the installation thread to release a form-fitting means.

2. The tool according to claim 1 in which the installation thread is 2-10% larger than a bolt thread of the threaded bolt.

3. The tool according to claim 1, in which the stop means and the unlocking means are realized by only one radially displaceable actuator, which comprises a driving or releasing construction at a radially inward projecting end.

* * * * *